US011794985B2

(12) United States Patent
Miozzo et al.

(10) Patent No.: US 11,794,985 B2
(45) Date of Patent: Oct. 24, 2023

(54) COMPOSTABLE LID INTENDED TO SEAL A CAPSULE AND A CAPSULE SEALED BY THE LID

(71) Applicant: Ahlstrom Oyj, Helsinki (FI)

(72) Inventors: Valerio Miozzo, Saint-Jorioz (FR); Hervé Planchard, Crach (FR); Florence Vidal, Saint Cyr Au Mont D'Or (FR); Mireille Roux, Givors (FR)

(73) Assignee: AHLSTROM OYJ, Helsinki (FI)

( * ) Notice: Subject to any disclaimer, the term of this patent is extended or adjusted under 35 U.S.C. 154(b) by 181 days.

(21) Appl. No.: 16/096,866

(22) PCT Filed: Apr. 28, 2017

(86) PCT No.: PCT/FI2017/050329
§ 371 (c)(1),
(2) Date: Oct. 26, 2018

(87) PCT Pub. No.: WO2017/187024
PCT Pub. Date: Nov. 2, 2017

(65) Prior Publication Data
US 2020/0216256 A1 Jul. 9, 2020

(30) Foreign Application Priority Data
Apr. 29, 2016 (FR) ..................... 1653909

(51) Int. Cl.
*A47J 31/40* (2006.01)
*B65D 85/04* (2006.01)
(Continued)

(52) U.S. Cl.
CPC ........ *B65D 85/8043* (2013.01); *A47J 31/407* (2013.01); *A47J 31/3623* (2013.01);
(Continued)

(58) Field of Classification Search
CPC .... B65D 85/8043; B65D 77/20; B65D 65/40; B65D 65/466; B65D 43/02;
(Continued)

(56) References Cited

U.S. PATENT DOCUMENTS 2,832,522 A * 4/1958 Schlanger .......... B65D 43/0212
229/406
5,219,646 A * 6/1993 Gallagher ............. A61L 15/225
428/481
(Continued)

FOREIGN PATENT DOCUMENTS

CN 1240166 A 1/2000
CN 101553360 A 10/2009
(Continued)

OTHER PUBLICATIONS

Bigg DM. Polylactide Copolymers:Effects of Copolymer Ratio and End Capping on their Properties, Advances in Polymer Technology, vol. 24, No. 2, p. 71 (Year: 2005).*
(Continued)

*Primary Examiner* — Lee E Sanderson
(74) *Attorney, Agent, or Firm* — CANTOR COLBURN LLP

(57) ABSTRACT

A compostable lid intended to seal a beverage capsule is provided. The lid is composed of a multilayer complex successively comprising a non-woven material wherein at least 50% by weight of the fibers are composed of polylactic acid (PLA), an adhesive layer suitable for coming into contact with food, and a support layer composed of a vegetable parchment.

20 Claims, 3 Drawing Sheets

(51) Int. Cl.
  *B65D 85/804* (2006.01)
  *A47J 31/36* (2006.01)
  *B65D 65/46* (2006.01)

(52) U.S. Cl.
  CPC ............... *B32B 2262/0276* (2013.01); *B32B 2307/7163* (2013.01); *B65D 65/466* (2013.01); *Y10T 428/3179* (2015.04)

(58) Field of Classification Search
  CPC ............ B65D 43/0214; B65D 43/0222; B65D 43/08; B65D 85/8046; B32B 29/02; B32B 29/022; B32B 2439/06; B32B 2262/06; B32B 2262/062; B32B 2262/065; Y02W 90/10; A47J 31/0642; A47J 31/0668; A47J 31/3676; A47J 31/407; Y10T 428/3179
  USPC ............................................. 428/481; 99/295
  See application file for complete search history.

(56) References Cited

U.S. PATENT DOCUMENTS

| | | | |
|---|---|---|---|
| 5,325,765 | A | 7/1994 | Sylvan et al. |
| 5,362,776 | A | 11/1994 | Barenberg et al. |
| 7,025,908 | B1 | 4/2006 | Hayashi et al. |
| 7,153,530 | B2 | 12/2006 | Masek et al. |
| 7,176,349 | B1 | 2/2007 | Dhugga et al. |
| 7,208,535 | B2 | 4/2007 | Asrar et al. |
| 7,267,794 | B2 | 9/2007 | Amick |
| 7,276,361 | B2 | 10/2007 | Doi et al. |
| 7,543,527 | B2 | 6/2009 | Schmed |
| 7,658,141 | B2 | 2/2010 | Masek et al. |
| 8,361,527 | B2 | 1/2013 | Winkler et al. |
| 8,808,777 | B2 | 8/2014 | Kamerbeek et al. |
| 8,956,672 | B2 | 2/2015 | Yoakim et al. |
| 10,358,772 | B2 | 7/2019 | Heiskanen et al. |
| 2002/0127358 | A1 | 9/2002 | Berlin et al. |
| 2003/0003197 | A1 | 1/2003 | Berlin et al. |
| 2003/0217643 | A1 | 11/2003 | Masek et al. |
| 2004/0052987 | A1 | 3/2004 | Shetty et al. |
| 2004/0115310 | A1 | 6/2004 | Yoakim et al. |
| 2004/0258893 | A1 | 12/2004 | Penttinen et al. |
| 2005/0084677 | A1* | 4/2005 | Domard ............... C09D 105/08 428/403 |
| 2005/0202743 | A1* | 9/2005 | Hausmann ............ B32B 27/302 442/334 |
| 2005/0220997 | A1* | 10/2005 | Kronseder ............ B05D 3/101 427/372.2 |
| 2008/0083161 | A1* | 4/2008 | Shea ................. A01G 13/0268 47/9 |
| 2010/0139877 | A1 | 6/2010 | Black et al. |
| 2010/0260896 | A1 | 10/2010 | Yoakim et al. |
| 2012/0070542 | A1 | 3/2012 | Camera et al. |
| 2013/0071677 | A1 | 3/2013 | Penttinen et al. |
| 2013/0263385 | A1 | 10/2013 | Mora et al. |
| 2014/0037916 | A1* | 2/2014 | Reilly ................. B32B 3/10 428/200 |
| 2014/0272018 | A1 | 9/2014 | Koller et al. |
| 2014/0370161 | A1* | 12/2014 | Abegglen ............. A47J 31/22 426/115 |
| 2015/0151508 | A1* | 6/2015 | Planchard .............. B32B 7/12 442/361 |
| 2015/0197394 | A1 | 7/2015 | Zanetti |
| 2015/0298438 | A1 | 10/2015 | Nevalainen et al. |
| 2015/0336736 | A1 | 11/2015 | Cabilli |
| 2016/0157515 | A1* | 6/2016 | Chapman ............. A24B 13/00 131/352 |
| 2017/0107034 | A1* | 4/2017 | Okamoto ............. B65D 3/04 |
| 2017/0320305 | A1* | 11/2017 | McMillan ............ B32B 27/10 |
| 2018/0148250 | A1 | 5/2018 | Schaude |
| 2019/0016528 | A1* | 1/2019 | Kuhl ................. C08L 23/06 |
| 2020/0140187 | A1 | 5/2020 | Vidal et al. |

FOREIGN PATENT DOCUMENTS

| | | | | |
|---|---|---|---|---|
| CN | 102181077 | A * | 9/2011 | ......... B29C 48/0022 |
| CN | 103384486 | | 11/2013 | |
| CN | 104854001 | | 8/2015 | |
| CN | 105008249 | | 10/2015 | |
| EP | 1344722 | A1 | 9/2003 | |
| EP | 1529739 | A1 | 5/2005 | |
| EP | 1659909 | A1 | 5/2006 | |
| EP | 2648579 | A1 | 10/2013 | |
| EP | 2690035 | A1 | 1/2014 | |
| FR | 2 568 515 | | 2/1986 | |
| FR | 2 991 230 | | 12/2013 | |
| FR | 2991230 | A1 * | 12/2013 | ............ B32B 27/10 |
| JP | 5-132056 | | 5/1993 | |
| JP | 2003-237826 | | 8/2003 | |
| JP | 2004-99053 | | 4/2004 | |
| JP | 2012-76231 | | 4/2012 | |
| LU | 92989 | B1 * | 9/2017 | ............ B31D 1/026 |
| WO | 94/29506 | | 12/1994 | |
| WO | 02084029 | A2 | 10/2002 | |
| WO | WO 2011/015973 | | 2/2011 | |
| WO | 2011147825 | A1 | 12/2011 | |
| WO | WO 2012/077066 | | 6/2012 | |
| WO | 2014/122385 | | 8/2014 | |
| WO | 2014/126463 | | 8/2014 | |
| WO | 2015105410 | A1 | 7/2015 | |
| WO | WO 2015/121489 | | 8/2015 | |
| WO | 2015139140 | A1 | 9/2015 | |
| WO | WO 2015/170358 | | 11/2015 | |
| WO | WO-2015177591 | A2 * | 11/2015 | .......... B65D 65/466 |
| WO | 2016079701 | A1 | 5/2016 | |
| WO | 2016186645 | A1 | 11/2016 | |
| WO | 2016187724 | A1 | 12/2016 | |

OTHER PUBLICATIONS

Lunt, James, Large-scale production, properties and commercial applications of polylactic acid polymers, Polymer Degradation and Stability, 59, 145-152, 1999 (Year: 1999).*
Merriam-Webster Dictionary online access at https://www.merriam-webster.com/dictionary/vegetable%20parchment on Nov. 18, 2021 (Year: 2021).*
PrintWiki: The Free Encyclopedia Of Print archived online at https://web.archive.org/web//http://printwiki.org/Basis_Weight on May 7, 2009 (Year: 2009).*
Office Action issued in CN Appln. No. 201780025222.0 dated Mar. 20, 2020 (w/ translation).
Office Action issued in CN Appln. No. 201780025222.0 dated Aug. 15, 2019 (w/ translation).
International Search Report for PCT/FI2017/050329, dated Jun. 21, 2017, 4 pages.
Written Opinion of the ISA for PCT/FI2017/050329, dated Jun. 21, 2017, 5 pages.
Reddy et al., "Polylactic acid/polypropylene polyblend fibers for better resistance to degradation", Polymer Degradation and Stability, vol. 93, No. 1, Jan. 1, 2008, pp. 233-241.
Office Action issued in JP Appln. No. 2018-556424 dated Aug. 25, 2020 (w/ translation).
Office Action issued in U.S. Appl. No. 16/607,375 dated Sep. 30, 2020.
International Search Report for International Application No. PCT/EP2018/060888; International Filing Date Apr. 27, 2018; dated May 25, 2018; 4 pages.
MAYER; "Technical Intelligence—Vegetable Parchment—Papyrene"; The American Journal of Science and Arts, XXIX (LXXXVI): 278; May 1860.
Michelinman; "Unique High Oxygen Barrier Coatings for Food Packaging"; Oct. 10, 2016; Flexible Packaging Conference 2016.
Written Opinion for International Application No. PCT/EP2018/060888; International Filing Date Apr. 27, 2018; dated May 25, 2018; 5 pages.
Yam; "The Wiley Encyclopedia of Packaging Technology"; 3rd Edition; 2009; p. 909.

(56) References Cited

OTHER PUBLICATIONS

International Search Report for International Application No. PCT/EP2020/081280; International Filing Date Nov. 6, 2020; dated Feb. 4, 2021; 4 pages.
International Search Report for International Application No. PCT/EP2020/081281; International Filing Date Nov. 6, 2020; dated Nov. 25, 2020; 3 pages.
Written Opinion for International Application No. PCT/EP2020/081280; International Filing Date Nov. 6, 2020; dated Feb. 4, 2021; 5 pages.
Written Opinion for International Application No. PCT/EP2020/081281; International Filing Date Nov. 6, 2020; dated Nov. 25, 2020; 5 pages.

* cited by examiner

COMPOSTABLE LID INTENDED TO SEAL A CAPSULE AND A CAPSULE SEALED BY THE LID

CROSS-REFERENCE TO RELATED PATENT APPLICATIONS

This patent application is the U.S. national phase of International Application No. PCT/FI2017/050329 filed Apr. 28, 2017 which designated the U.S. and claims priority to French national application FR1653909, filed Apr. 29, 2016, the entire contents of each of which are hereby incorporated by reference.

FIELD OF THE INVENTION

The invention concerns a lid intended to seal a capsule, particularly of coffee. An object of the invention is also a capsule sealed by said lid. Finally, it concerns the utilization of said lid for sealing a capsule containing a food product, particularly ground coffee.

In the following description, the invention is described in relation to capsules of coffee. However, it is applicable to all domains in which the lid can be used to enclose food substances and it must be water resistant, pressure resistant, resistant to tearing, and advantageously heat-sealable onto a capsule or anything else containing food. More specifically, this invention applies to a compostable lid intended to seal a capsule containing a dry powder (e.g. coffee, tea, hot chocolate, etc.) for making a beverage.

BACKGROUND OF THE INVENTION

Coffee pods available in the market generally contain about 5-15 g of ground coffee. The amounts are less for tea on a mass basis, although the volume of material for infusion is generally comparable. Percolation time of the coffee machines is typically 10 to 60 seconds for a water volume ranging from as low as about 30-40 ml for espresso capsules to about 120-300 ml for drip coffee capsules.

In the food industry, the materials used are regularly subject to increasingly stringent requirements especially regarding environment. Thus, the currently developed products have no longer the sole objective of meeting consumer's tastes. They must also meet the requirements relating to the respect of the environment. These requirements may be regulatory, and may also reflect evolving consumer preferences for reusable, recyclable, or degradable products.

Two types of coffee pods are currently offered on the market, namely:
- flexible pods composed essentially of a sachet of non-woven material containing the coffee,
- rigid pods or capsules composed of an actual capsule closed by means of a lid.

The invention specifically concerns the capsules.

Generally known on the European market are capsules of the NESPRESSO® type. Such capsules are described, for example, in U.S. Pat. Nos. 7,153,530 and 7,658,141. These capsules are typically provided with a frustoconical side wall and dish-shaped bottom formed of aluminum (20-100 µm), a pure or multilayer plastic, a cardboard/aluminum/plastic composite, or a cardboard plastic composite. A layer of a fabric such as polyurethane is provided at the bottom of the capsule to filter coffee. The cover of such Nespresso® capsules may be formed from a variety of materials, such as aluminum or a multi-layer composite comprising paper, aluminum and/or plastic (e.g. polypropylene (PP), polyethylene (PE), polyamide (PA), polyethylene terephthalate (PET), ethylene vinyl alcohol (EVOH), polyvinylidene chloride (PVDC), etc.).

Typically, the circular cover is heat-welded or crimped to the periphery of the capsule side wall. However, there is a strong demand to transform these non-compostable capsules into compostable capsules.

Additional features of NESPRESSO® capsules are described in U.S. Pat. No. 8,956,672, which discloses capsules having an inverted cup-shaped body with a sidewall and a truncated bottom injection wall collectively defining a chamber, and a bottom cover/lid. The cover/lid is affixed to a flange-like rim with a curved end, and may be formed from aluminum or a multi-layer composite comprising paper, aluminum and/or plastic (e.g. polypropylene (PP), polyethylene (PE), polyamide (PA), polyethylene terephthalate (PET), ethylene vinyl alcohol (EVOH), polyvinylidene chloride (PVDC), etc.).

The delivery cover/lid is sealed to the body at the curved flange-like rim, and includes a calibrated orifice or perforating means such that the restriction(s) created by the orifice provides elevated back pressure in the capsule during the extraction process. A filter material may optionally be placed between the chamber and the cover.

Additional capsule designs are disclosed in EP2690035B1. The capsule described therein includes a perforated bottom wall which is stiffened by a circular rib, a generally truncated cone or frustoconical side wall having a flange/rim, and a cover/lid which is affixed to the rim after loading the capsule with a beverage ingredient.

Further capsule designs are disclosed in U.S. Pat. No. 7,543,527. The capsule is formed from a cylindrical or slightly tapered cup. An upper distribution member is positioned inside the cup on an upper shoulder, proximate to the cover, to modify the flow of liquid into the cup during brewing. The cup further includes a lower distribution member to collect flow out of the cup during extraction of the brewed beverage. The cup and cover consist of a gas-tight, multi-layer composite film.

Methods and assemblies for preparation of food/beverage products are disclosed by EP 1 659 909 B1. A capsule includes a bottom wall and a tapered side wall with a flange extending outwardly from the cup and sidewall. The cup is typically made of a plastic material, such as EVOH, PVDC, PP, PE, and/or PA in a mono- or multi-layer construction. The body of the cup is sealed by a cover/lid on the flange, for example by heat sealing. The cover/lid is a perforatable material, such as aluminum, aluminum/plastic, cardboard/plastic, cardboard/aluminum/plastic, or a mono- or multi-layered plastic.

Further capsule designs are disclosed by EP 2 648 579 B1. A cartridge or capsule is supplied as a small cup with various shapes including frustoconical, prismatic, frustopyrimidal, etc. A side wall and bottom wall define a volume which is sealed at the end opposite the bottom wall by a sealing foil. The sealing foil is heat-sealed to a flange/rim provided on the side wall of the cup.

Although many variations have been proposed concerning the actual capsule part, many capsules currently on the market remain resistant to composting. Thus, capsules composed of a polylactic acid-based (PLA) plastic material or plastic materials called "PLA compatible" have been developed. The materials called "PLA compatible" correspond to a mixture of PLA and plant fibers. They are biodegradable and compostable. Thus, these capsules fulfill the conditions of compostability imposed by the EN 13432 standard.

However, to date no satisfactory solution has been proposed for combining lids that are also compostable with said capsules. As used herein, the term "compostable lid" designates a lid comprising a maximum of 5% by weight of non-compostable binder or fibers, thus meeting EN 13432

This is not surprising since the limitations relating to the cover or lid are numerous. Indeed, said capsules are likely to be used in coffee machines at pressure and temperature values for which they must be mechanically resistant.

Essentially, capsules are used in a single-serve espresso coffee machine according to the following process. Once the capsule is placed in its position, the bottom thereof is punctured. The orifices formed allow the introduction of water, heated to a temperature of 96° C., into the body of the capsule at a pressure of between 10 and 12 bars. The water filling the capsule progressively exerts a pressure on the lid which comes in contact with puncturing elements arranged in the machine, such as pins. The pressure at the time of perforation of the lid and during percolation is most often between 5 and 15 bars depending on the particle size of the coffee. Once the lid has been punctured by means of the pins, the coffee flows into the cup. Manufacturers impose a number of conditions in terms of the flow of coffee. In particular, there must be no powder in the cup. Moreover, a capsule of around 30 ml typically drains off in about 30 seconds. Furthermore, the flowing liquid should have a color and density similar to that of foam. There are also a certain number of limitations once the coffee has flowed while the capsule has not yet been ejected. Indeed, if the user only ejects the capsule a few hours after the coffee has flowed out, i.e. once the temperature of the capsule returns to ambient temperature, the capsule should not be deformed. Otherwise, it does not fall into the receptacle provided for that purpose when a new capsule is inserted. The lids should not be delaminated.

Additionally, a compostable lid is considered satisfactory in terms of pressure resistance when the lid does not tear when it is subjected to a pressure exerted by the mixture of powder and water of between 5 and 15 bars at the time of perforation of the lid and during percolation. Before the perforation, the lid must not tear under the effect of the pressure of the water rising in the capsule. After perforation, the holes from the perforation must maintain their shape and the lid material should not allow large tears to propagate from the holes under the effect of pressure. In other words, a compostable lid is needed that is resistant to moisture and pressure so as not to tear prior to the moment it is punctured. It is also necessary to provide a lid that does not allow the powder to pass through when the coffee the flows out.

FR 2 991 230 A1 describes a multilayer complex combining a non-woven material of biodegradable polymer, a layer of adhesive suitable for coming into contact with food and a cellulose fiber support, for the manufacture of molds. In particular, this document describes the advantage of using this type of complex under the wet conditions suitable for the implementation of said molds. Naturally, no pressure condition is mentioned since it is not a parameter to take into account for this application.

The problem the invention proposes to resolve, therefore, is to devise a compostable lid for sealing a capsule, in particular a capsule containing coffee, which meets the conditions of use of this type of lid in coffee machines, in particular, resistance to moisture and pressure, absence of delamination, and filtering properties to prevent the passage of coffee into the cup at the moment of percolation.

Another problem that the invention proposes to resolve is also that of improving a lid that can be integrated into current lid manufacturing processes without substantial modification to said processes.

The invention provides such a compostable lid for sealing a capsule. These and other advantages of the invention, as well as additional inventive features, will be apparent from the description of the invention provided herein.

BRIEF SUMMARY OF THE INVENTION

In one aspect, the invention provides a compostable lid. The lid is intended to seal a beverage capsule. The lid is composed of a multilayer complex successively comprising: a non-woven material comprising fibers, of which at least 50% by weight of the fibers are composed of biodegradable fibers; an adhesive layer suitable for coming into contact with food; and a support composed of a vegetable parchment.

In some embodiments, the compostable lid is characterized in that at least 40% by weight of the biodegradable fibers are heat-sealable fibers.

In various embodiments, the compostable lid is further characterized in that the biodegradable fibers are selected from the group of fibers consisting of PLA, PHA (polyhydroxyalkanoate), PHB (Poly (hydroxybutyrate)), PHB (V) (poly (hydroxybutyrate-co-hydroxyvalerate)), PBS (poly (butylenesuccinate)), biopolyesters, and cellulose fibers such as cotton, flax, and wood fibers.

In various embodiments, the compostable lid is further characterized in that the heat sealable fibers are selected from the group consisting of PLA, PHA (polyhydroxyalkanoate), PHB (poly (hydroxybutyrate)), PHB (V) (poly (hydroxybutyrate-co-hydroxyvalerate)), PBS (poly (butylenesuccinate)), and biopolyesters.

In various embodiments, the compostable lid is further characterized in that the non-woven material comprises heat-sealable fibers that have a melting point of at least about 100° C.

In some embodiments, the compostable lid is characterized in that the non-woven material comprises 100% by weight of fibers, of which at least 50% by weight are composed of polylactic acid fibers.

In some embodiments, the compostable lid is characterized in that the fibers of the non-woven material are composed exclusively of polylactic acid.

In some embodiments, the compostable lid is further characterized in that the grammage of the non-woven material is between 5 and 100 $g/m^2$, advantageously between 10 and 30 $g/m^2$, still more advantageously between 15 and 20 $g/m^2$, and preferably on the order of 18 $g/m^2$.

In some embodiments, the compostable lid is further characterized in that the non-woven material is a bilayer.

In some embodiments, the compostable lid is further characterized in that the adhesive is an acrylic adhesive. The compostable lid may be characterized in that the adhesive represents between 1 and 5 $g/m^2$ dried, advantageously between 1 and 4 $g/m^2$ dried, more advantageously between 2 and 3 $g/m^2$ dried, preferably on the order of 3 $g/m^2$ dried with respect to the surface of the multilayer complex. In general, the adhesive amount should preferably not exceed a maximum of 5% of the total weight of the lid.

In some embodiments, the compostable lid is further characterized in that the grammage of the vegetable parchment layer is between 30 and 120 $g/m^2$, advantageously between 50 and 100 $g/m^2$, more advantageously between 60 and 80 $g/m^2$, and preferably on the order of 70 $g/m^2$.

In some embodiments, the compostable lid is further characterized in that the vegetable parchment layer has an oxygen transfer rate less than 1.5 ml/m²/day, and preferably less than 1.0 ml/m²/day, measured at an atmospheric pressure of 1.013 bar, a temperature of 23° C., and a relative humidity of 50% according to ASTM D 3895 and ASTM F 1927.

In some embodiments, the compostable lid is further characterized in that the vegetable parchment layer has a wet burst strength measured according to ISO 3689 and a dry burst strength measured according to ISO 2758, and wherein the ratio of the wet burst strength to the dry burst strength is between 50 to 70 percent, preferably between 55 to 65 percent.

In some embodiments, the compostable lid is further characterized in that the vegetable parchment layer has a thickness between 60 to 150 micrometers, measured according to ISO 534.

In various embodiments, the compostable lid is further characterized in that the lid is compostable by the EN 13432 standard.

In some aspects, the invention comprises a beverage capsule including the compostable lid. In some embodiments, the beverage capsule contains coffee.

In some embodiments, the beverage capsule comprises a capsule body, wherein the capsule body is made of PLA or of a PLA compatible material.

In some embodiments, the compostable lid is utilized to seal a capsule, the lid being positioned in such a way that the heat-sealable non-woven material is on the surface of the lid facing the capsule.

In some embodiments, the beverage capsule is used in a single-serve beverage machine.

In some embodiments, the beverage capsule is compostable by the EN 13432 standard.

In still another aspect, the invention provides a method of using the compostable lid to seal a coffee beverage capsule. In further aspects of the method, the non-woven material of the compostable lid of the beverage capsule is on the surface of the lid facing the capsule.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF EMBODIMENTS

Figure 1:
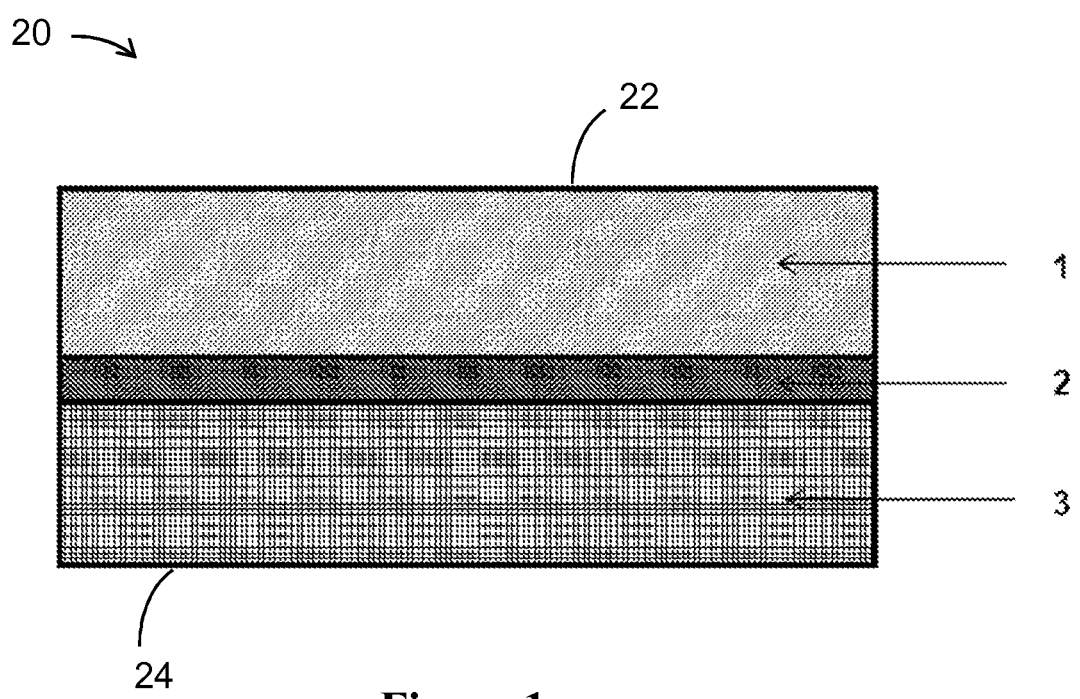
FIG. 1 is a cross-sectional representation of a lid material according to the present invention.

Referring to FIG. 1, the applicant has devised a complex combining a non-woven material 3 based on biodegradable and heat-sealable fibers, more particularly PLA fibers, an adhesive layer 2, and a vegetable parchment support 1, that is a suitable material for forming a lid 20 for beverage capsules. The lid 20 thus obtained is resistant to pressure, moisture and is easily integrated into existing capsule manufacturing processes. Moreover, the non-woven layer 3 prevents the passage of the powder through the lid 20 at the moment the coffee flows into the cup.

The lid 20 may be used to seal a capsule containing coffee. Embodiments of a lid 20 may be particularly used to seal the coffee and beverage capsules discussed above. Additionally, the lid 20 is suitable for use in both upright applications (that is, where the cover or lid 20 is at the top of the capsule during brewing and extraction operations) and inverted applications (that is, where the cover or lid 20 is at the bottom of the capsule during brewing and extraction operations). In some applications, bottom 36 may also include a second lid according to the present invention, which may be pierced in the same manner as lid 20.

In specific embodiments, the lid 20 is a multilayer complex successively comprising the non-woven material 3 wherein at least 50% of the fibers are composed of polylactic acid fibers. Adhesive layer 2 is a material suitable for coming into contact with food under the conditions of use of the lid 20.

According to a first characteristic, the lid 20 of the invention contains a non-woven material 3, at least 50% of the fibers of which are composed of biodegradable and heat-sealable fibers. The heat-sealable fibers typically have a melting point between 100° C. to 250° C., and more preferably between 100° C. to 200° C.

In a preferred embodiment, the fiber non-woven material 3 are composed of at least 80% polylactic acid fibers, more preferably at least 85% polylactic acid fibers, and still more preferably at least 90% polylactic acid fibers. The PLA fibers advantageously have a diameter of between 10 and 15 micrometers.

The polylactic acid (PLA) has the particular advantage of being biosourced, biodegradable and compostable. As used herein, "polylactic acid" and "PLA" refers to a renewable, biodegradable, thermoplastic, aliphatic polyester formed from a lactic acid or a source of lactic acid, for example, renewable resources such as corn starch, sugarcane, etc. The term PLA may refer to all stereoisomeric forms of PLA including L- or D-lactides, and racemic mixtures comprising L- and D-lactides. For example, PLA may include D-polylactic acid, L-polylactic acid (also known as PLLA), D,L-polylactic acid, meso-polylactic acid, as well as any combination of D-polylactic acid, L-polylactic acid, D,L-polylactic acid and meso-polylactic acid. PLAs useful herein may have, for example, a number average molecular weight in the range of from about 15,000 and about 300,000. In preparing PLA, bacterial fermentation may be used to produce lactic acid, which may be oligomerized and then catalytically dimerized to provide the monomer for ring-opening polymerization. PLA may be prepared in a high molecular weight form through ring-opening polymerization of the monomer using, for example, a stannous octanoate catalyst, tin (II) chloride, etc.

As also used herein, the term "biodegradable polymer" indicates that the polymer may be broken down into organic substances by living organisms, such as by microorganisms. Biodegradable polymers may include one or more of: polyhydroxyalkanoates (PHAs), including polylactic acid or polylactide (PLA), as well as co-polymers of PLA and PHAs other than PLA; biodegradable polyethylene (PE); biodegradable polypropylene (PP); biodegradable polybutane (PB); starch-based polymers; cellulose-based polymers; ethylene vinyl alcohol (EVOH) polymers; other biodegradable polymers such as polybutanediolsuccinic acid (PBS); etc. In a preferred embodiment, the biodegradable non-woven described herein meets the compostability and biodegrability standards of EN 13432.

As also used herein, the term "polyhydroxyalkanoates (PHAs)" refers broadly to renewable, thermoplastic aliphatic polyesters which may be produced by polymerization of the respective monomer hydroxy aliphatic acids (including dimers of the hydroxy aliphatic acids), by bacterial fermentation of starch, sugars, lipids, etc. PHAs may include one or more of: poly-beta-hydroxybutyrate (PHB) (also known as poly-3-hydroxybutyrate); poly-alpha-hydroxybutyrate (also known as poly-2-hydroxybutyrate); poly-3-hydroxypropionate; poly-3-hydroxyvalerate; poly-4-hydroxybutyrate; poly-4-hydroxyvalerate; poly-5-hydroxyvalerate; poly-3-hydroxyhexanoate; poly-4-hydroxyhexanoate; poly-6-hydroxyhexanoate; polyhydroxybutyrate-valerate (PHBV); polyglycolic acid; polylactic acid (PLA), etc., including copolymers, blends, mixtures, combinations, etc., of different PHA polymers, etc. PHAs may be synthesized by methods disclosed in, for example, U.S. Pat. No. 7,267,794 (Kozaki et al.), issued Sep. 11, 2007; U.S. Pat. No. 7,276,361 (Doi et al.), issued Oct. 2, 2007; U.S. Pat. No. 7,208,535 (Asrar et al.), issued Apr. 24, 2007; U.S. Pat. No. 7,176,349 (Dhugga et al.), issued Feb. 13, 2007; and U.S. Pat. No. 7,025,908 (Williams et al.), issued Apr. 11, 2006, the entire disclosures and contents of each of the foregoing documents being herein incorporated by reference.

The term "cellulose-based polymer" refers to a polymer, or combination of polymers, which may be derived from, prepared from, etc., cellulose. Cellulose-based polymers which may be used in embodiments of the present invention may include, for example, cellulose esters, such as cellulose formate, cellulose acetate, cellulose diacetate, cellulose propionate, cellulose butyrate, cellulose valerate, mixed cellulose esters, etc., and mixtures thereof.

In general, the non-woven material 3 is a biodegradable polymer material obtained by random arrangement of individual fibers that are interlaced. The cohesion of the fibers to each other can be enhanced, for example, by the addition of adhesive or binders (latex, polyvinyl alcohol, starch, etc.), by heating, pressure, or by bonding. Numerous methods for preparing non-woven materials form part of the knowledge of a person skilled in the art. For example, they include methods of meltblowing, spin laying, spunbond, carding, air laying, or water laying.

In addition to PLA fibers, the non-woven material 3 can include additives, mineral fillers, and/or fibers from at least one biosourced polymer, which may be a biodegradable polymer. For example, the non-woven material 3 can include cellulose fibers, such as cotton, flax, and wood fibers, and/or cellulose-based polymers. The incorporation of additives, fillers, or other fibers can make it possible to modulate the melting point of the non-woven layer 3.

In one advantageous embodiment, the cohesion of the fibers and therefore of the non-woven material is obtained in the absence of adhesive or binder by a manufacturing method called spunbound.

Under these conditions, the non-woven material comprises 100% by weight of fibers, of which at least 50% by weight, advantageously 100% by weight, are composed of PLA fibers.

The non-woven material can be single layer. Advantageously, it can involve a bilayer non-woven material. The bilayer can be single-component, i.e. containing only one type of PLA, or bi-component, i.e. containing 2 types of PLA having different melting points.

Figure 3:
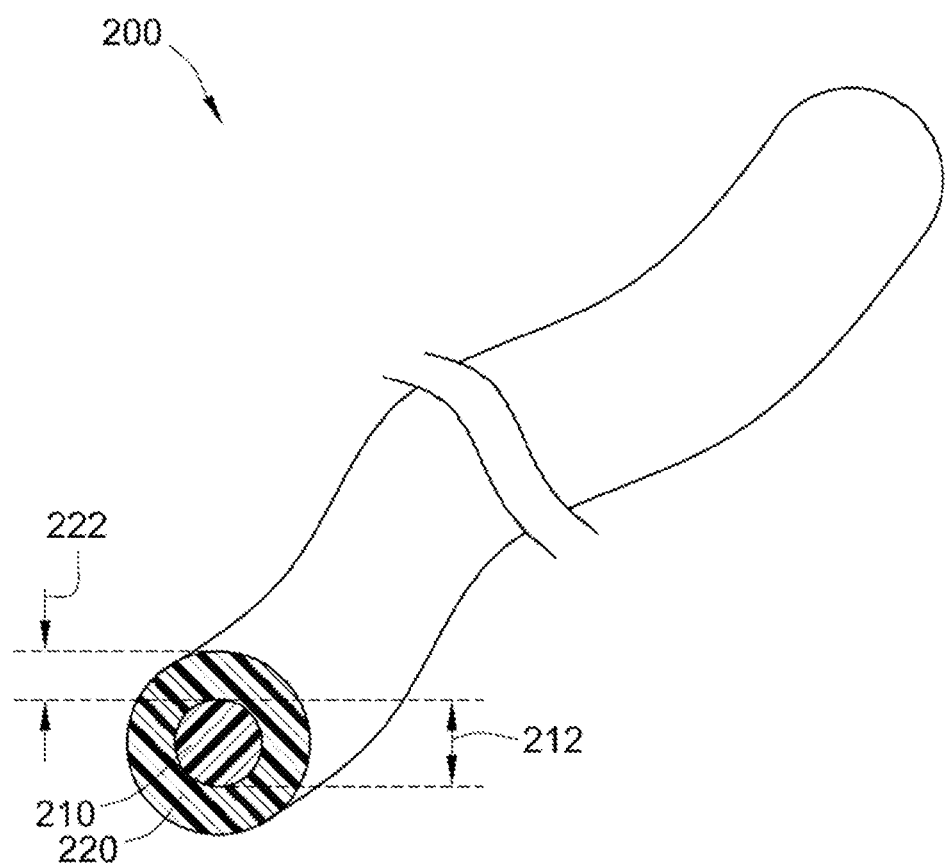
FIG. 3 is a cross-section of a bicomponent fiber suitable for forming a lid according to the present invention.

Referring to FIG. 3, a PLA fiber suitable for forming non-woven material 3 is shown. In some embodiments, PLA fibers 200 of non-woven material 3 of lid 20 may have a core/shell structure, i.e. the fibers 200 are bicomponent fibers. In one embodiment, fibers 200 include a core 210 containing polylactic acid (PLA-1) coated with an envelope or sheath 220 containing polylactic acid (PLA-2). Core 210 has a diameter 212, and sheath 220 has a radial thickness 222. The ratio of diameter 212 to radial thickness 222 may also be altered to vary the properties of fibers 200.

The non-woven material 3 may be characterized in that the PLA-1 of core 210 is a copolymer of lactic acid monomer L1 and lactic acid monomer D1. The PLA-2 of sheath 220 is a copolymer of lactic acid monomer L2 and lactic acid monomer D2, whose D2 monomers rate is greater than the monomers rate D1 of PLA-1. The core 210 may further contain a polymeric plasticizer.

In a preferred embodiment, the non-woven material 3 consists exclusively of the above-identified fibers 200. In some embodiments, the sheath 220 may also contain a plasticizer.

According to another characteristic, the air permeability of the nonwoven measured according to the standard DIN 53.887 is between 3000 and 5000 l/m²/s.

Finally, in practice the grammage of the non-woven material is between 5 and 100 g/m², advantageously between 10 and 30 g/m², still more advantageously between 15 and 20 g/m², and preferably on the order of 18 g/m².

According to another characteristic, the lid contains a layer of adhesive suitable for coming into contact with food, particularly under the conditions of use of the lid.

The adhesive suitable for food contact makes it possible to ensure the cohesion of the multilayer complex when it is exposed to a temperature close to or higher than the melting temperature of the PLA during the heat-sealing of the lid onto the capsule. The adhesive also enables the vegetable parchment support to be maintained on the PLA layer welded to the capsule when the multilayer complex is in contact with the hot water during percolation, then during cooling.

The term "adhesive suitable for coming into contact with food" designates any type of adhesive generally used in the agro-food industry. However, it can advantageously be chosen from the group comprising acrylic adhesives, polyurethane adhesives, ethylene-vinyl acetate and mixtures thereof.

In a preferred embodiment, the adhesive suitable for coming into contact with food is chosen from among the acrylic adhesives marketed by Lubrizol in the Carbobond® and Hycar® line, alone or as a mixture.

In practice, the quantity of adhesive represents between 1 and 5 g/m² dried, advantageously between 2 and 4 g/m² dried, preferably on the order of 3 g/m² dried with respect to the surface of the multilayer complex.

Advantageously, the adhesive layer contains a mixture of the cited acrylic latexes, in a proportion of about 1 g/m² dried, each.

According to a preferred characteristic of the invention, the support is composed of a vegetable parchment. The vegetable parchment is usually paper treated with sulfuric acid. Less commonly, zinc chloride can be used. The fibers are cellulose fibers generally chosen from among eucalyptus fibers and resinous fibers. In practice, the acid partially dissolves or gelatinizes the cellulose around the fibers. A cellulosic gel is formed, which is then precipitated. In a subsequent stage, the support is rinsed. See Mayer, Ferdinand F (May 1860). *"Technical Intelligence—Vegetable Parchment—Papyrene"*. The American Journal of Science and Arts. XXIX (LXXXVI): 278, the entire contents of which are incorporated by reference. This treatment forms a sulfurized cross-linked material with high density, stability, and heat resistance, and low surface energy, thereby imparting good non-stick or release properties. Other types of cellulose fibers may be used to form a vegetable parchments, such as cotton, flax, and wood cellulose fibers.

The support is therefore not a high density greaseproof paper or a greaseproof paper treated chemically (for example by a fluorinated resin). The support also contains no resin obtaining a mechanical resistance when wet.

In typical embodiments, the grammage of the vegetable parchment layer is between 30 and 120 $g/m^2$. In some embodiments, the grammage of the vegetable parchment layer advantageously between 60 and 80 $g/m^2$, and preferably on the order of 70 $g/m^2$. In other embodiments, the grammage of the vegetable parchment layer is preferably between 70 $g/m^2$ and 110 $g/m^2$.

The vegetable parchment layer may be characterized by both wet burst strength as measured by ISO 3689 and dry burst strength as measured by ISO 2758. In order to improve resistance to pressure, the vegetable parchment will have a wet burst strength to dry burst strength ratio between about 50-70%, and more preferably between about 55-65%. In one embodiment, a lid formed according to the present invention incorporates a vegetable parchment layer available under the commercial name "SULFLEX® HPL", which at a grammage of 70 $g/m^2$ has a wet burst strength between about 180-270 kPa, a dry burst strength between about 300-400 kPa, and a wet burst/dry burst ratio of about 60-67%.

In some embodiments, the vegetable parchment layer may also act as an oxygen barrier. A target oxygen transfer rate (OTR) through the lid is less than 1.5 $ml/m^2/day$, and preferably less than 1.0 $ml/m^2/day$ (measured at an atmospheric pressure of 1.013 bar, a temperature of 23° C., and a relative humidity of 50% according to ASTM D 3985 and ASTM F 1927). Some examples of measured oxygen transfer rate values of SULFLEX® vegetable parchment material are disclosed in TABLE 1 below.

TABLE 1

| Vegetable Parchment Material | Oxygen transfer rate ($ml/m^2/day$) |
|---|---|
| Sulflex ® - 70 $g/m^2$ | 756 |
| Sulflex ® HPL - 70 $g/m^2$ | 1.4 |
| Sulflex ® HPL - 110 $g/m^2$ | 0.96 |

The thickness of the multilayer complex, the object of the invention, is typically between 60- and 150 micrometers, and advantageously between 90 and 115 micrometers, while the PLA fibers-based non-woven material generally has a thickness of between 20 and 30 micrometers.

According to a particular embodiment, the compostable lid of the invention is composed of a multilayer complex comprising successively:
- a non-woven material of which 100% by weight of the fibers are composed of polylactic acid (PLA), the grammage of which is between 15 and 20 $g/m^2$;
- an adhesive layer composed of acrylic polymer suitable for coming into contact with food, applied in a proportion of 2 to 4 $g/m^2$, dried;
- a support composed of a vegetable parchment, the grammage of which is between 60 and 80 $g/m^2$.

The present invention also concerns the method of preparing the lid described above. Said method comprises the following steps:
- coating a support of a vegetable parchment with an adhesive suitable for coming into contact with food;
- application of a non-woven material, the fibers of which are composed of at least 50% by weight of polylactic acid (PLA) fibers, onto the support advantageously by association by passing through a press;
- drying of the multilayer complex thus obtained, advantageously by hot air or by contact with heated cylinders.

An object of the invention is also a coffee capsule in particular, comprising a capsule per se containing the ground coffee closed with the lid as described above, the lid being positioned in such a way that the non-woven material is facing the surface of the capsule.

In a preferred embodiment, the capsule per se is made of PLA or a PLA compatible material. This has the advantage of being able to secure the lid to the capsule by heat-sealing insofar as the materials are compatible (PLA or PLA compatible).

The invention also concerns the use of the previously described lid for enclosing a capsule, in particular a coffee capsule, the lid being positioned in such a way that the non-woven material is facing the edge of the capsule.

The method of manufacturing said capsule comprises the following steps:
- a strip is formed of a multilayer complex successively comprising:
  - a non-woven material of which at least 50% by weight of the fibers are composed of polylactic acid (PLA) fibers;
  - an adhesive layer suitable for coming into contact with food;
  - a support composed of a vegetable parchment,
- in parallel, the cells formed in a plate are filled with individual capsules containing coffee in particular,
- the strip is superimposed onto the plate, so that the non-woven material is facing the plate,
- the strip is cut in front of each of the capsules in order to form lids,
- the lids are heat-sealed onto the capsules.

The invention and the advantages deriving therefrom will be better understood from the figures and the following example provided in order to illustrate the invention in a non-limited manner.

Figure 2:
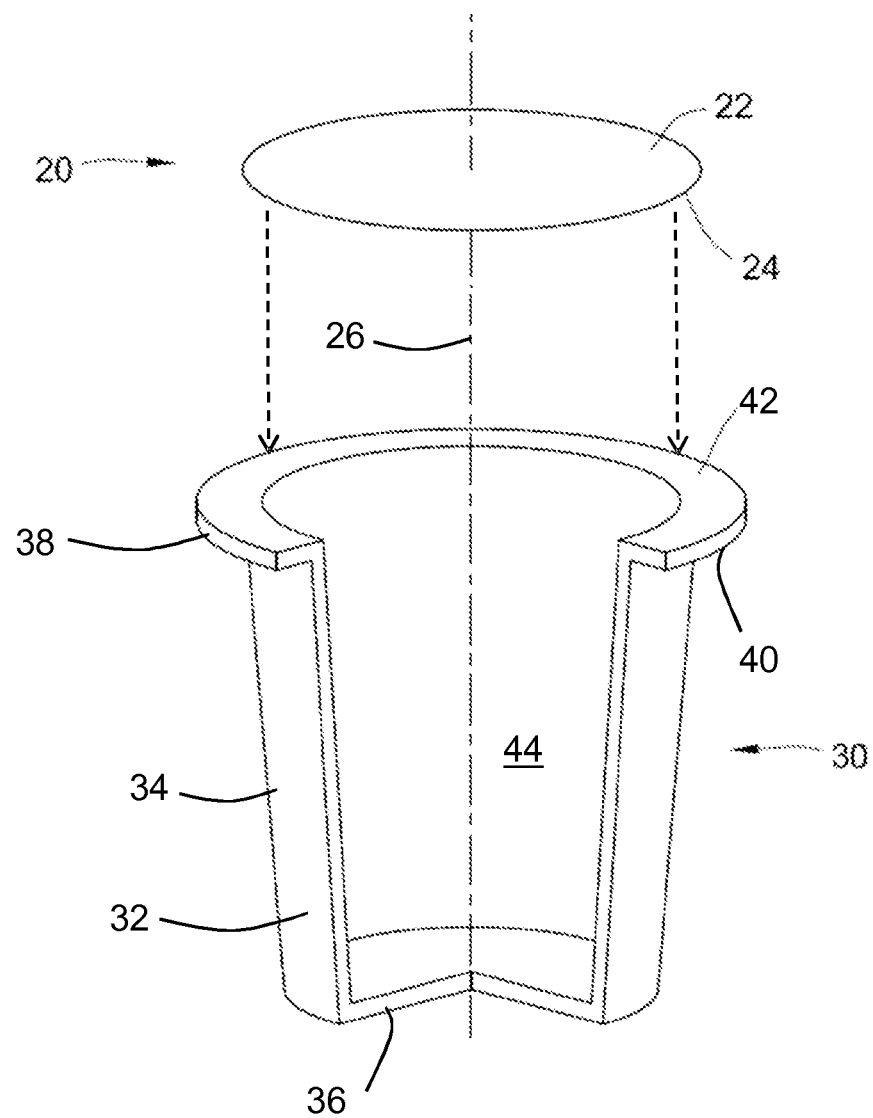
FIG. 2 is a representation of a beverage capsule including a lid according to the present invention.

Referring now to FIG. 2, a general form of a capsule 30 suitable for use with a lid 20 is shown. FIG. 2 is generally representative of known types of capsules, including without limitation: NESPRESSO® capsules described, for example, in U.S. Pat. Nos. 7,153,530 and 7,658,141, and the capsules described in U.S. Pat. No. 7,543,527, EP 2 690 035 B1, EP 1 659 909 B1, and/or EP 2 648 579 B1, each of which is incorporated by reference in its entirety. Accordingly, the capsule of FIG. 2 may optionally include one or more features disclosed therein, in combination with the lid 20 of the present invention.

Capsule 30 generally includes a body 32. As shown, body 32 may include a side wall 34 and a bottom wall 36 defining a central volume 44. Side wall 34 may be cylindrical, conical, frustoconical, etc. as is generally known in the art and described above. Side wall may include a flange 38 extending radially outward from the longitudinal axis 26 of lid 20 and capsule 30. Flange 38 is shown including a lower surface 40 and an upper surface 42.

Capsule 30 may include one or more filtering and/or fluid distribution units. For example, a filter material may be affixed within the central volume 44 of capsule 30 by attachment of the filter material to the upper surface 42 of flange 38. The filter material may partially or completely cover the upper surface 42 of flange 38. In other exemplary embodiments, a filter material may be affixed to bottom wall 36 of capsule 30, or to the bottom surface 24 of lid 20.

After manufacture of capsule body 32 and filling of capsule body 32 with a food item (e.g., ground coffee, tea leaves, hot chocolate mix, etc.), lid 20 is affixed to capsule 30. In typical embodiments, bottom surface 24 of lid 20 is affixed to the upper surface 42 of flange 38 of capsule body 32.

In a preferred embodiment, lid 20 is heat sealed to capsule 30, such that the non-woven layer 3 is contacted and heat-sealed to the capsule 30. In other embodiments, lid 20 may be sealed to capsule 30 via an adhesive, laser welding, ultrasonic welding, or other methods known in the art.

EXAMPLE

Represented in FIG. 1 is a lid 20 having a top surface 22 and a bottom surface 24. Lid 20 is provided in the form of a multilayer complex successively comprising a support 1 made of a vegetable parchment, an adhesive layer 2 suitable for coming into contact with food, and a non-woven material 3 comprising 100% by weight of fibers composed of PLA. The multilayer complex of lid 20 is oriented with the parchment support layer 1 facing outwards from the capsule, and the non-woven layer 3 facing inwards towards the capsule. Parchment support layer 1 may optionally include printed information, such as capsule contents, manufacturer, etc.

The support 1 is preferably a vegetable parchment marketed by the applicant under the commercial names "SULPACK®" or "SULFLEX®". In one exemplary embodiment, the grammage is 70 g/m².

The adhesive layer 2 is a mixture of acrylic latex in proportion of about 3 g/m² chosen from the line Carbobond and Hycar in a proportion of about 1 g/m² each.

In a preferred embodiment, the non-woven material 3 is in two layers formed exclusively of PLA fibers made by spin-laying the fibers. The core 210 and sheath 220 contain the same polylactic acid (PLA-1).

The lid 20 may be heat-sealed onto a beverage capsule filled with, for example, ground coffee. The lid 20 is composed essentially of compostable polymers compatible with PLA. The capsule thus obtained generates a flow of coffee within the time required by the manufacturers (about 10 to 60 seconds), accompanied by a foam of a quality that is equivalent to current capsules. The lid thus manufactured meets the EN 13432 compostability standard and is suitable for a capsule that is also designed to meet the EN 13432 compostability standard.

To test the resistance of an assembled capsule including a body 32 and a lid 20, assembled capsules are placed in a NESPRESSO® Pixie machine. During percolation, the pressure within the capsule rises and reaches a peak of between about 5 to 15 bar, depending on the granularity of the coffee grounds contained in the capsule. Lids assembled according to the invention do not tear under pressures reaching 15 bar under the experimental conditions therein. All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE SIGNS LIST 1 support
2 adhesive layer
3 non-woven material
20 lid
22 top surface
24 bottom surface
26 longitudinal axis
30 capsule
32 body
34 side wall
36 bottom
38 flange
40 lower surface
42 upper surface
44 central volume
200 fiber
210 core
212 diameter
220 sheath
222 thickness

CITATION LIST

Patent Literature

U.S. Pat. No. 7,153,530
U.S. Pat. No. 7,658,141

U.S. Pat. No. 8,956,672
EP 2 690 035 B1
U.S. Pat. No. 7,543,527
EP 1 659 909 B1
EP 2 648 579 B1
FR 2 991 230 A1
U.S. Pat. No. 7,267,794
U.S. Pat. No. 7,276,361
U.S. Pat. No. 7,208,535
U.S. Pat. No. 7,176,349
U.S. Pat. No. 7,025,908

Non-Patent Literature

Mayer, Ferdinand F (May 1860). "*Technical Intelligence—Vegetable Parchment—Papyrene*". The American Journal of Science and Arts. XXIX (LXXXVI): 278

What is claimed is:

1. A compostable lid sealed to a beverage capsule, the lid composed of a multilayer complex successively comprising:
    a non-woven material comprising fibers, of which at least 50% by weight of the fibers are composed of biodegradable fibers;
    an adhesive layer suitable for coming into contact with food; and
    a support composed of a vegetable parchment;
    wherein the compostable lid extends from a first surface to a second surface, the non-woven material positioned proximal to the second surface and the support positioned proximal to the first surface, with the adhesive layer positioned between the non-woven material and the support; and
    wherein the second surface of the compostable lid is affixed to a surface of a flange of a capsule body of the beverage capsule to seal the beverage capsule, with the non-woven material facing inwards towards the beverage capsule;
    wherein the grammage of the non-woven material is between 5 and 100 g/m$^2$;
    wherein the vegetable parchment layer has a wet burst strength measured according to ISO 3689 and a dry burst strength measured according to ISO 2758, and wherein the ratio of the wet burst strength to the dry burst strength is between 50 to 70 percent.

2. The compostable lid according to claim 1, wherein at least 40% by weight of the biodegradable fibers are heat-sealable fibers.

3. The compostable lid according to claim 1, wherein the biodegradable fibers are selected from the group of fibers consisting of PLA (polylactic acid), PHA (polyhydroxyalkanoate), PHB (poly (hydroxybutyrate)), PHB (V) (poly (hydroxybutyrate-co-hydroxyvalerate)), PBS (poly (butylenesuccinate)), biopolyesters, and cellulose fibers.

4. The compostable lid according to claim 1, wherein the heat sealable fibers are selected from the group of fibers consisting of PLA (polylactic acid), PHA (polyhydroxyalkanoate), PHB (poly (hydroxybutyrate)), PHB (V) (poly (hydroxybutyrate-co-hydroxyvalerate)), PBS (poly (butylenesuccinate)), and biopolyesters.

5. The compostable lid according to claim 1, wherein the non-woven material comprises heat-sealable fibers that have a melting point of at least about 100° C.

6. The compostable lid according to claim 1, wherein the non-woven material comprises 100% by weight of fibers, of which at least 50% by weight are composed of PLA (polylactic acid) fibers.

7. The compostable lid according to claim 6, wherein the fibers of the non-woven material are composed exclusively of PLA (polylactic acid).

8. The compostable lid according to claim 1, wherein the non-woven material is a bilayer.

9. The compostable lid according to claim 1, wherein the adhesive is an acrylic adhesive.

10. The compostable lid according to claim 1, wherein the adhesive represents between 1 and 5 g/m$^2$ dried with respect to the surface of the multilayer complex.

11. The compostable lid according to claim 1, wherein the grammage of the vegetable parchment layer is between 30 and 120 g/m$^2$.

12. The compostable lid according to claim 1, wherein the vegetable parchment layer has an oxygen transfer rate less than 1.5 ml/m$^2$/day, measured at an atmospheric pressure of 1.013 bar, a temperature of 23° C., and a relative humidity of 50% according to ASTM D 3895 and ASTM F 1927.

13. The compostable lid according to claim 1, wherein the vegetable parchment layer has a wet burst strength measured according to ISO 3689 and a dry burst strength measured according to ISO 2758, and wherein the ratio of the wet burst strength to the dry burst strength is between 55 to 65 percent.

14. The compostable lid according to claim 1, wherein the vegetable parchment layer has a thickness between 60 to 150 micrometers.

15. The compostable lid according to claim 1, wherein the lid is compostable by the EN 13432 standard.

16. The compostable lid according to claim 1, wherein the compostable lid sealed to the beverage capsule is configured to not tear under pressures of 5 to 15 bar.

17. A beverage capsule according to claim 1, wherein the capsule contains coffee.

18. A beverage capsule according to claim 1, wherein the capsule body is made of PLA (polylactic acid).

19. A beverage capsule according to claim 1, wherein the capsule is used in a single-serve beverage machine.

20. A beverage capsule according to claim 1, wherein the capsule is compostable by the EN 13432 standard.

* * * * *